United States Patent
Majaniemi

(10) Patent No.: US 7,039,364 B2
(45) Date of Patent: May 2, 2006

(54) METHOD FOR PERFORMING MEASUREMENTS IN A WIRELESS TERMINAL AND A WIRELESS TERMINAL

(75) Inventor: Markku Majaniemi, Tampere (FI)

(73) Assignee: Nokia Corporation, Espoo (FI)

( * ) Notice: Subject to any disclaimer, the term of this patent is extended or adjusted under 35 U.S.C. 154(b) by 512 days.

(21) Appl. No.: 10/242,915

(22) Filed: Sep. 12, 2002

(65) Prior Publication Data

US 2003/0054772 A1    Mar. 20, 2003

(30) Foreign Application Priority Data

Sep. 14, 2001   (FI) .................................. 20011820

(51) Int. Cl.
*H04B 17/00* (2006.01)

(52) U.S. Cl. .................. 455/67.11; 455/67.13; 455/67.14; 455/423; 455/62; 455/63.1; 455/296; 375/219; 375/341; 375/344; 370/484; 370/514

(58) Field of Classification Search ............ 455/67.11, 455/67.14, 423, 62, 63.1, 296; 375/219, 375/341, 344; 370/484, 514
See application file for complete search history.

(56) References Cited

U.S. PATENT DOCUMENTS

| | | | |
|---|---|---|---|
| 5,630,218 A | | 5/1997 | Muto |
| 5,987,320 A | * | 11/1999 | Bobick .................. 455/423 |
| 5,991,622 A | * | 11/1999 | Henry, Jr. .............. 455/434 |
| 6,023,477 A | * | 2/2000 | Dent ...................... 370/509 |
| 6,049,577 A | * | 4/2000 | Gothe et al. ............. 375/368 |
| 6,134,233 A | * | 10/2000 | Kay ........................ 370/350 |
| 6,144,710 A | * | 11/2000 | Chen et al. .............. 375/346 |
| 6,205,334 B1 | * | 3/2001 | Dent ...................... 455/434 |
| 6,208,668 B1 | * | 3/2001 | Dorenbosch .......... 370/509 |
| 6,249,539 B1 | * | 6/2001 | Harms et al. ........... 375/130 |
| 6,330,428 B1 | * | 12/2001 | Lewis et al. ............ 455/67.11 |
| 6,400,929 B1 | * | 6/2002 | Ue et al. ................. 455/69 |
| 6,728,326 B1 | * | 4/2004 | Fulghum ................. 375/365 |
| 6,888,810 B1 | * | 5/2005 | Faber ..................... 370/335 |
| 2001/0017599 A1 | | 8/2001 | Yule et al. |

FOREIGN PATENT DOCUMENTS

| WO | 8903048 | 4/1989 |
|---|---|---|
| WO | WO 98/27684 | 6/1998 |
| WO | WO 99/10997 | 3/1999 |
| WO | 9938347 | 7/1999 |
| WO | 0035208 | 6/2000 |
| WO | WO 00/31998 | 6/2000 |

OTHER PUBLICATIONS

Mouly, M. et al., "Radio Resource Management," XP-000860006, GSM System for Mobile Communications, Lassay-Les-Chateaux, Europe Media, France, 1993.

* cited by examiner

*Primary Examiner*—Marceau Milord

(57) ABSTRACT

The invention relates to a method for performing measurements in a wireless terminal comprising a receiver for receiving radio frequency signals, means for taking samples from the received signals and means for performing measurements on the basis of said samples. The samples taken from the received signal are stored. Measured values are calculated for the stored samples after a set of samples has been stored.

18 Claims, 3 Drawing Sheets

METHOD FOR PERFORMING MEASUREMENTS IN A WIRELESS TERMINAL AND A WIRELESS TERMINAL

CROSS REFERENCE TO RELATED APPLICATIONS

This application claims priority under 35 USC §119(e) to Finnish Patent Application No. 20011820 filed on Sep. 14, 2001.

FIELD OF THE INVENTION

The present invention relates to a method for performing measurements in a wireless terminal comprising a receiver for receiving radio frequency signals, means for taking samples from the received signals and means for performing measurements on the basis of said samples. The invention also relates to a wireless terminal comprising a receiver for receiving radio frequency signals, means for taking samples from the received signals and means for performing measurements on the basis of said samples. Moreover, the invention relates to a system comprising a wireless terminal containing means for receiving radio frequency signals of a receiver, means for taking samples from the received signals and means for performing measurements on the basis of said samples.

BACKGROUND OF THE INVENTION

In mobile communication systems, wireless terminals are connected to a mobile communication network via one or more base stations, for example to receive and make phone calls. The wireless terminal and the mobile communication network exchange messages also at other times than during the active connection, for instance to select the most suitable base station for the communication between the wireless terminal and the mobile communication network. A base station via which the wireless terminal communicates with the mobile communication network is generally called a serving base station. Typically, the serving base station is such a base station which is located closest to the wireless terminal, but in some conditions it is possible to attain a better quality for the connection via another base station. Such a situation may occur for example in blind spots, for example as a result of signal attenuation caused by buildings and/or geography. Furthermore, when the wireless terminal moves in the borderline of the range of the base station or outside the same, the quality of the connection may be weakened to such an extent that attempts are made to change the serving base station to another base station of the mobile communication network.

To estimate the quality of connection, measurements are performed in the wireless terminal with the aim of finding out the strength of the signal transmitted by one or more base stations in the vicinity of the wireless terminal, and possibly also the noise level. The wireless terminal can transmit this measurement data to the mobile communication network in which measurement information is used for selecting the most suitable base station for the connection, and the serving base station is changed, if necessary.

In the GSM system a time division/frequency division multiple access system (TDMA/FDMA) according to the GSM system is used in the physical layer (radio channel). The basic transmission unit is called a burst, which is formed of a predetermined number of bits that are transmitted to the radio channel. Eight bursts, i.e. time slots constitute one TDMA frame. These frames are utilized for forming a wider multiframe that comprises 51 TDMA frames. These multiframes are used for the implementation of logical channels. The multiframe contains so-called frequency control channels (FCCH) and synchronizing channels SCH. In the frequency control channels a frequency correction burst (FCB) is transmitted at intervals, by means of which the receiver of the wireless terminal can conduct fine-tuning of the frequency of its frequency synthesizer. In the frequency correction burst a pure sine wave (PSW) (i.e. a sort of a carrier wave) is transmitted, the frequency of which is 67.71 kHz. In the synchronizing channel a synchronization burst SB is transmitted at intervals, by means of which the receiver can conduct the synchronization with the multiframe. The frequency correction burst and the synchronization burst are transmitted in successive frames in the same time slot, wherein the time between these bursts is eight time slots (=1 frame). FIG. 1 illustrates this multiframe structure in a reduced manner. Furthermore, the multiframe of the GSM system also comprises other logical channels, such as a broadcast control channel BCCH. Other channels have also been determined, but it is not necessary to discuss them in more detail in this description. In other mobile communication systems corresponding frame structures and logical channels have also been determined.

When the wireless terminal is searching for radio channels for example in a situation where the wireless terminal is not logged into the network or the connection to the serving base station has been terminated, the wireless terminal searches for the sine wave transmitted by the base station. This sine wave is for example a synchronizing signal preceding the SCH frame. The receiver of the wireless terminal provides samples of the antenna signal (Rx-sample) at intervals of approximately 30 microseconds. A measured value is calculated from these samples, which measured value can be utilized for determining whether the sine wave in question can be found in the channel under examination. The duration of one measurement in a wireless terminal of prior art falls in the order of 2 μs, depending on the computing efficiency of the digital signal processing unit. This time is used by the digital signal processing unit of the wireless terminal to calculate the measured value, during which time the digital signal processing unit is, in principle, incapable of performing other actions. In practice, the digital signal processing unit is in a wait mode also during the time between the measurements, because this time is not, in practice, sufficient for performing demanding signal processing measures. This complicates for example the act of performing other demanding signal processing measures in wireless terminals.

Thus, during the process of searching for the base station signal, wireless terminals of prior art are incapable of performing e.g. functions related to a voice controlled user interface, such as speech recognition, speech recording, playback of recordings, changing of the user profile, etc., because the short waiting periods between the calculations are too short for executing voice control applications. The search for the base station signal is performed for example always when the wireless terminal searches for the mobile communication network. If the wireless terminal is in such a location in which the reception from the base stations of the mobile communication network is poor, the wireless terminal may search for the base station signal frequently. This means that to be able to use said voice controlled user interface, the wireless terminal must be logged into the mobile communication network. However, situations may occur in which the user of the wireless terminal would like to perform functions of the voice controlled user interface irrespective of the fact whether or not the wireless terminal is logged into the mobile communication network. It should, for example, be possible to listen to recordings also when the wireless terminal is not logged into the mobile communication network.

The wireless terminal can also search for the base station signals when it is logged into the mobile communication network. Thus, the adjacent cells are monitored, in case it is necessary to change the serving base station. Thus, on the basis of these measurements of the adjacent cells it is possible to make conclusions which base station is selected as a new serving base station in the mobile communication network.

There are different audio applications under development for wireless terminals, such as the above-mentioned voice-controlled user interface. This requires that voice recognition measures are conducted for example for recognition of voice commands. In some wireless terminals that are under development, the intention is to implement recording and listening functions of recordings and other corresponding operations. Such voice recognition applications require a great deal of real-time processing capacity. Especially in conventional portable wireless terminals there is, however, only one digital signal processing unit available, which is used in many signal processing functions. One solution for this limited processing capacity is to prevent the search for base station signals while audio applications are executed. The execution of audio application should not, however, last longer than a few seconds, because there is a risk that the wireless terminal loses the connection to the mobile communication network. Said time limit may be sufficient for recognition of short voice commands, but often this period of time is not sufficient for example for storing and listening to recordings.

Hereinabove, audio applications are presented only as an example, but corresponding problems may also occur in other applications in which a great amount of real-time processing is required during measurements of the base station signal.

SUMMARY OF THE INVENTION

It is an aim of the present invention to achieve an improved method for performing measurements of base station signals in a wireless terminal and a wireless terminal in which the act of performing measurements of the base station signals is improved when compared to solutions of prior art. The invention is based on the idea that samples taken from the received (antenna) signal are stored and a measured value is calculated for several samples successively. Thus, the time between the calculations can be considerably increased and during this time the digital signal processing unit can perform other measures. More precisely, the method according to the present invention is primarily characterized in that samples taken from the received signal are stored, and the measured values are calculated for the stored samples after a set of samples has been stored. The wireless terminal according to the invention is primarily characterized in that it comprises means for storing the samples taken from the received signal, and means for starting the calculation of measured values after a set of samples has been stored. The system according to the invention is primarily characterized in that it comprises means for storing the samples taken from the received signal, and means for starting the calculation of measured values after a set of samples has been stored.

The present invention shows remarkable advantages compared to solutions of prior art. When the method according to the invention is applied, it is possible to calculate several measured values in one calculation stage, wherein the time between the calculation stages can be increased significantly. Thus, this time is sufficiently long for performing other functions in the digital signal processing unit. Especially the act of performing audio applications and other functions requiring large processing capacity becomes possible without significantly interfering with the measurement of base station signals. The connection to the wireless terminal is not terminated as easily, because the time between the calculation stages may be selected such that measurements of the base station signal are conducted sufficiently often.

BRIEF DESCRIPTION OF THE DRAWINGS

In the following, the invention will be described with reference to the appended drawings, in which.

DETAILED DESCRIPTION OF THE INVENTION

Figure 1:
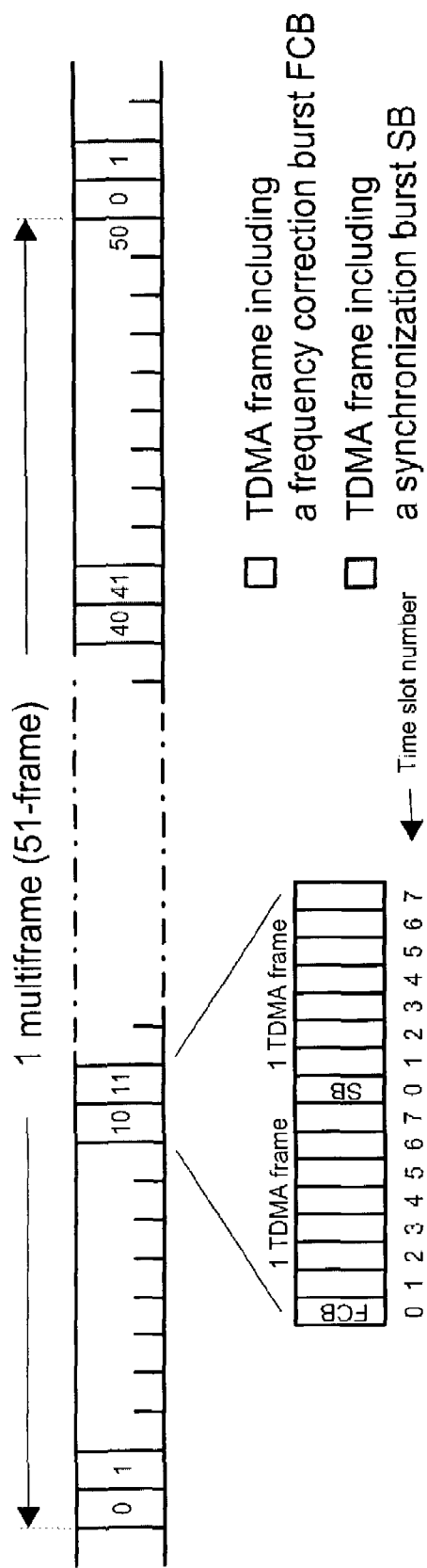
FIG. 1 shows the structure of the multiframe used in the GSM mobile station system in a reduced manner.
Figure 2:
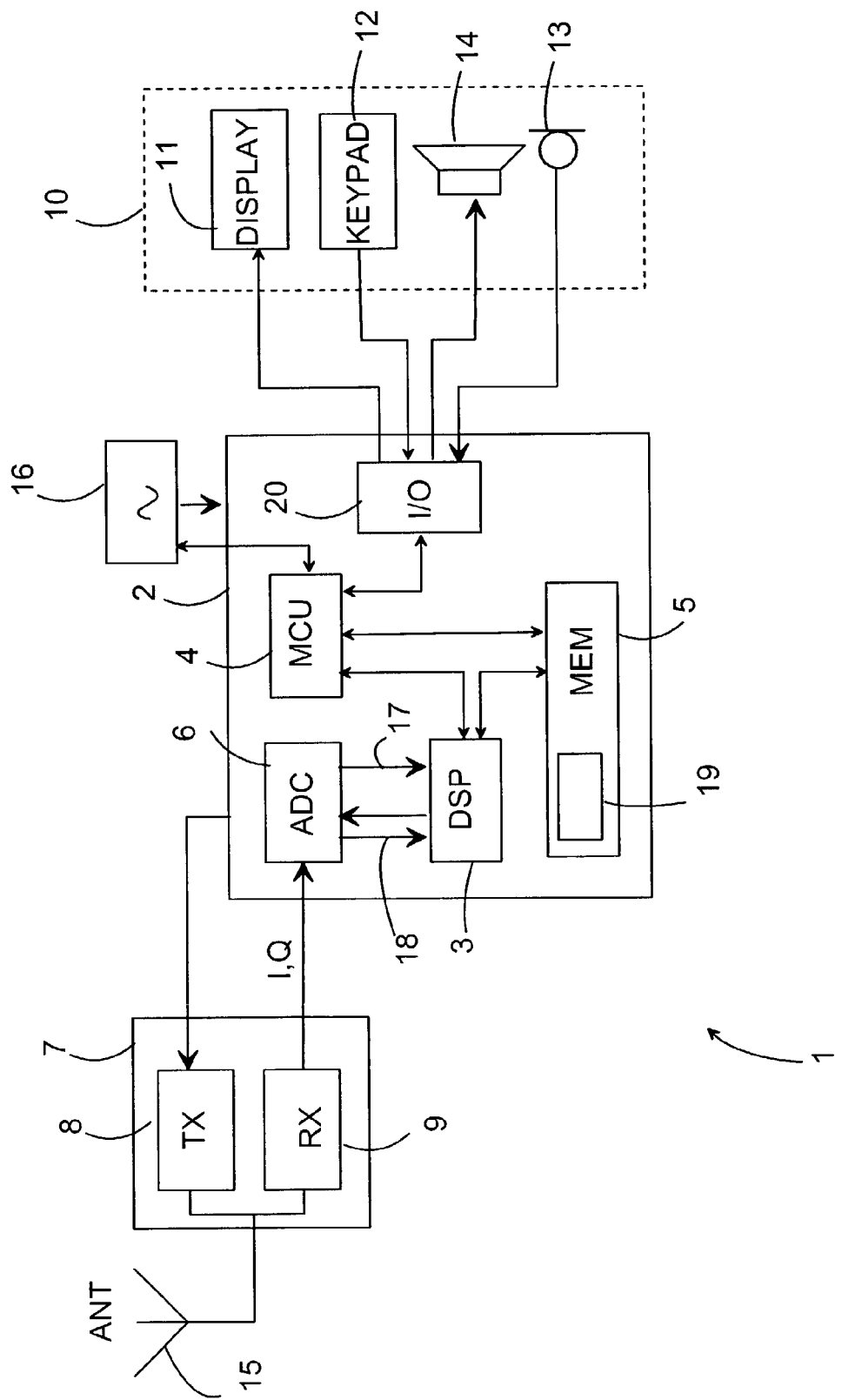
FIG. 2 shows the wireless terminal according to a preferred embodiment of the invention in a reduced block chart.

FIG. 2 shows, in a reduced block chart, a wireless terminal 1 complying with a preferred embodiment of the invention. The wireless terminal 1 comprises a control block 2 containing advantageously a digital signal processing unit 3 (DSP) and a processor 4, such as a micro controlling unit (MCU). The control block 2 can still contain a memory 5, one or more analog-to-digital converters 6 (ADC) and interface logic 20 (I/O, Input/Output). The control block is implemented for example by means of an application specific integrated circuit (ASIC) or the like. It is, however, obvious that the control block can also be implemented as separate functional blocks. The wireless terminal 1 also contains mobile station means 7, such as a transmitter 8 and a receiver 9. The wireless terminal 1 further contains a user interface 10 comprising advantageously a display 11, a keypad 12, a microphone 13 and an earpiece 14. It is obvious that instead of or in addition to the earpiece the user interface may contain a speaker (not shown). There are also known wireless terminals, such as the Nokia 9210 Communicator that contain two keypads and two display devices.

The processor 4 is used in a wireless terminal 1 according to this preferred embodiment to control for example the function of the different blocks of the wireless terminal 1, such as the user interface 10, the mobile station means 7 and the digital signal processing unit 3.

When the wireless terminal 1 is activated, the processor performs initialization functions in a manner known as such to set the wireless terminal 1 ready for operation. At the stage when the wireless terminal 1 starts the process of logging into the mobile communication network, the reception of the radio frequency signals to be received via the antenna 15 is started in the receiver. The receiver aims at receiving the signals of several receiving channels and performs signal strength measurements for signals received in different channels. The received channels are set in an order of magnitude on the basis of the signal strength, and after that the receiver is tuned to receive the radio channel with the greatest signal strength. Thereafter the search for the frequency control channel begins by examining the received signal to find out whether a pure sine wave signal (frequency 67.71 kHz) can be detected therein. The act of performing the examination will be described below in this description. If the frequency control channel is found, attempts are then made to receive information transmitted on the synchronization channel for example to synchronize the receiver with the multiframe. However, if the frequency control channel is not found, the radio channel with the next greatest signal strength is selected as a receiving channel, and a search for the frequency control channel begins. The search continues until such a radio channel has been found in which the frequency control channel is transmitted or until all radio channels have been examined. In some applications it is possible to set a threshold value for the signal strength, wherein signal strengths below the threshold value are not taken into account. In this way it is possible to avoid the setting up of connections of too poor quality.

The following is a description of a method according to a preferred embodiment of the invention for performing measurements in connection with the search for the frequency control channel. The processor 4 guides the digital signal-processing unit to perform measurement functions of the base station signal. The frequency of the frequency synthesizer 16 is set in such a manner that the receiver receives the signals of the radio channel that is under examination at a given time. The signals converted to an intermediate frequency or a baseband are conducted to the analog-to-digital converter 6 for the process of taking samples. The digital signal processing unit 3 advantageously activates the analog-to-digital converter 6, which starts to take samples from the received signal. Furthermore, the digital signal processing unit initializes the sample buffer 19 to the memory 5, preferably to a random access memory (RAM). The length of the sample buffer 19 may vary in different applications and in different situations. The length of the sample buffer 19 determines the number of samples that can be stored before it is necessary to conduct calculation. After the function of taking samples has been started, the digital signal processing unit 3 can start performing other functions.

The analog-to-digital converter 6 starts taking samples. The time passed for sampling depends on the sampling speed of the analog-to-digital converter 6. After the sample has been finished, the analog-to-digital converter advantageously forms an interruption signal to an interruption line 17 (INT), which is transmitted to the digital signal processing unit 3. In the digital signal processing unit the next step is to execute the relevant interruption service program in which the state of the interrupted process is first stored in a manner known as such. In the interruption service program a numerical value is read from the data bus 18 of the analog-to-digital converter, which value describes the value of the received signal at the time of sampling. This value is stored in the sample buffer 19, whereafter it is examined in the digital signal processing unit whether a predetermined number of samples has already been stored. If the predetermined number of samples has not been stored yet, information is set to indicate the location where the next sample is to be stored. This can be conducted for example in such manner that the digital signal processing unit contains in its internal register or memory 5 an indicator indicating the address of the storage location of this sample. Thus, the value of this indicator is increased in such a manner that it indicates the next free storage location for the sample, which is known as such. In the end of the interruption service the state of the interrupted process is restored and the interrupted process continues.

The above-mentioned storing of the samples in the sample buffer can also be implemented in such a manner that the analog-to-digital converter 6 stores samples to a temporary buffer or directly to the sample buffer. In this embodiment it is not necessary for the digital signal processing unit 3 to start executing the interruption service program after each sample has been finished, but this can be done either at that stage when the temporary buffer is full or a predetermined number of samples has been stored in the sample buffer. When the temporary sample buffer is used, for example the digital signal processing unit 3 transfers the samples to the actual sample buffer.

In practice, the samples are advantageously complex samples, i.e. samples are taken simultaneously from two different signals (I/Q, In phase/Quadrature phase). Thus, both the I-component and the Q-component (i,q) are stored from the samples.

Figure 3:
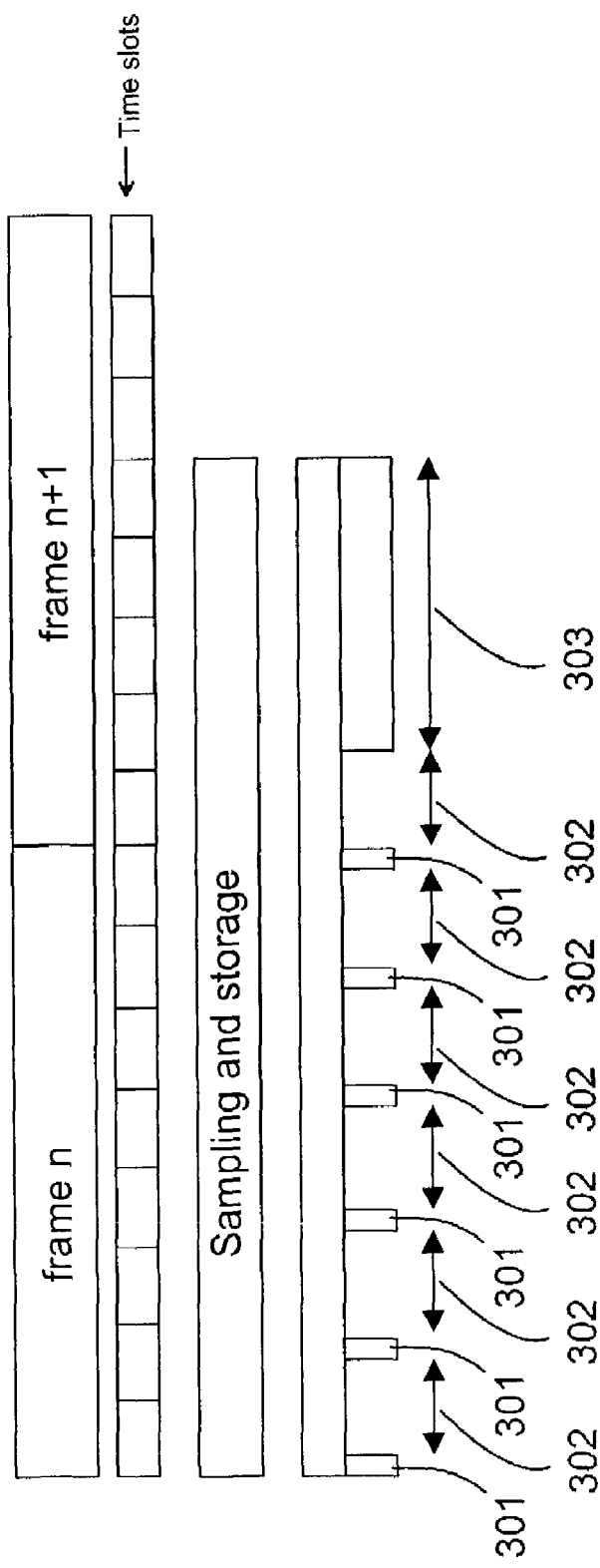
FIG. 3 shows the act of performing measurements according to a method of a preferred embodiment of the invention in a reduced timing chart.

At that stage when a predetermined number of samples has been stored, the system starts to execute the calculation stage. This calculation stage that is represented with the reference numeral 301 in FIG. 3 can be implemented in the same interruption service program, or in such a manner that a flag is set in the interruption service program. This flag is examined in the operating system program of the digital signal processing unit, or in a corresponding program, wherein the calculation stage is started on the basis of the setting of this flag. At the calculation stage two or more measured values are calculated. Thus, on the basis of the first sample of the sample buffer the digital signal processing unit 3 advantageously retrieves a first sample from the sample buffer 19, calculates a first measured value on the basis of the same and stores it in the memory 5. Thereafter the digital signal processing unit 3 advantageously retrieves a second value from the sample buffer 19, calculates a second measured value and stores it in the memory 5. The above-described operation continues for the next samples, until a measured value has been calculated for all stored samples. Thereafter the digital signal processing unit 3 analyses the calculated measured values and determines whether or not the base station has transmitted a pure sine wave on a predetermined channel. If such a pure sine wave was detected, the wireless terminal advantageously starts to receive 303 the frame of the synchronization channel to be transmitted on this radio channel. If a sine wave was not detected, the above-mentioned measurement functions are started again, and the channel to be listened to is changed, if necessary. The time available for the signal processing unit 3 for performing other processes, is illustrated with arrows 302 in FIG. 3.

The manner in which the existence of the frequency control channel can be determined on the basis of the measured values depends on the application in question and on the way in which the measured value is calculated. It is, for example, possible to examine the variation of the measured values and to search certain kinds of variation points, for example maximum points, zero points, or the like.

After it has been detected that the signal in question is the signal of the frequency control channel (carrier wave), it is possible to determine the stage in which the synchronization burst is transmitted on the basis of the time of this signal. When the method according to the invention is applied, it is also taken into account when the correct timing is determined that the calculation of the samples is not conducted immediately after the sampling but at a later stage. On the basis of the determined timing information it is possible to set the receiver to receive the synchronization burst transmitted on the synchronization channel at a suitable moment in time. If the reception of the synchronization channel is successful, it is for example possible to determine in which point of the multiframe the transmission is in progress on the basis of the information transmitted on the synchronization channel. Thereafter the wireless terminal 1 is synchronized with the base station signal.

In the wireless terminal 1 it is also possible to perform measurements of the base station signals of the adjacent cells and search for a pure sine wave in a corresponding manner. These measurements are typically performed less often than the signal measurements of the serving base station, wherein the above-presented buffering of the samples does not necessarily have to be performed. The invention can, however, also be applied in these measurements, if necessary.

After the above-described storing stage of the sample, the digital signal processing unit 3 can thus start conducting other signal processing functions. Thus, it is possible to start for example voice recognition functions, wherein the user can, for example, change his/her user profile in the wireless terminal, record e.g. a dictation or listen to a stored recording. Such a function may last longer than the interval between samplings, wherein the function is interrupted for the duration of storing the samples. This is not, however, inconvenient, because the time used for storing is relatively short as a result of the fact that actual calculation is not conducted after the storing of each sample. The signal processing functions conducted between samplings can last longer than the intervals between the calculation stages. This does not significantly impede the act of performing the signal processing functions, because they can be continued after the calculation stage. In solutions of prior art, however, the frequently occurring calculation stages mean that the signal processing functions should be interrupted often, wherein most of the time between the calculation stages would be passed for storing and returning of information. Thus, the time left for the actual signal processing functions would not be sufficient to guarantee that the functions will take place in real-time. Furthermore, because the digital signal processing unit does not have an operating system, and therefore processes and automatic scheduling of the same on the basis of priorities etc. are not present therein, the speech recognition calculation should be split into very short calculation periods in the program code of the digital signal processing unit.

Other functions which require real-time operation are also possible in the wireless terminal 1 according to the invention. Examples of these functions that can be mentioned in this context include MIDI player functions and MP3 player functions. Thus, listening of music stored in MP3 format is not interrupted for the duration of said measurement functions for such a long period of time that it would hamper listening.

It is also possible to combine a predetermined number of stored samples (i, q) before calculating the measured value, wherein the combined samples are used for calculating the measured value. The combination can be performed, for example, by calculating a mean value of the predetermined number of stored samples, by summing the predetermined number of stored samples, etc.

The invention can be applied for example in the GSM system, but the invention is not, however, restricted only to this system. The invention can also be applied in other systems, especially in systems repeating relatively short processes, in which it is necessary to wait for the completion of another process, such as sampling, and in which the waiting time is too short for conducting other processes.

The present invention can to a great extent be advantageously implemented in the application software of the digital signal processing unit 3.

It is obvious that the present invention is not limited solely to the above-presented embodiments, but it can be modified within the scope of the appended claims.

The invention claimed is:

1. A method for performing measurements in a wireless terminal comprising:
   receiving radio frequency signals;
   taking samples (i,q) from the received signals; and
   performing measurements on the basis of said samples,
      wherein the samples taken from the received signal are stored and measured values are calculated for the stored samples after a set of samples has been stored, and
   wherein the measured values are used to search for a carrier wave in the received signal.

2. The method according to claim 1, wherein storing of samples and calculation of the measured value is repeated at intervals, wherein two or more samples are taken and stored between each successive calculation of the measured value.

3. The method according to claim 1, wherein the number of samples in said set of samples is selected.

4. The method according to claim 1, a predetermined number of stored samples are combined before calculating the measured value, wherein the combined samples are used for calculating the measured value.

5. The method according to claim 1, wherein in addition to sampling and storage said means for performing measurements execute one or more other applications between the different calculations of the measured values.

6. The method according to claim 1, wherein the calculated measured values are used for searching a carrier wave from the received signal.

7. The method according to claim 6, wherein the received signal is a signal transmitted by a base station of a mobile communication network, in which frequency correction bursts are transmitted on a frequency control channel, and the carrier wave to be searched for is a sine wave signal used in the transmission of the frequency correction burst.

8. A wireless terminal eempfising comprising:
   a receiver for receiving radio frequency signals;
   means for taking samples from the received signals; and
   means for performing measurements on the basis of said samples,
wherein the wireless terminal further comprises means for storing samples taken from the received signal signal, and means for starting the calculation of the measured values after a set of samples has been stored, and
   wherein the measured values are used to search for a carrier wave in the received signal.

9. The wireless terminal according to claim 8, wherein it comprises means for repeating the storing of samples and calculation of the measured value at intervals, wherein two or more samples are arranged to be taken and stored between each successive calculation of the measured value.

10. The wireless terminal according to claim 8, wherein it comprises means for selecting the number of samples in said set of samples.

11. The wireless terminal according to claim 8, wherein it comprises means for combining a predetermined number of stored samples before the measured value is calculated and means for using the combined samples in the calculation of the measured value.

12. The wireless terminal according to claim 8, wherein in addition to sampling and storage, said means (3) for performing measurements arranged to execute one or more other applications between the different calculations of the measured values.

13. The wireless terminal according to claim 8, wherein it comprises means for searching for a carrier wave on the basis of the measured values calculated from the received signal.

14. The wireless terminal according to claim 13, wherein the received signal is a signal transmitted by a base station of a mobile communication network, in which frequency correction bursts are transmitted on a frequency control channel, and the carrier wave to be searched for is a sine wave signal used in the transmission of the frequency correction burst.

15. A system comprising:
a wireless terminal including a receiver for receiving radio frequency signals, means for taking samples from the received signals, and means for performing measurements on the basis of said samples,
the system further comprising means for storing samples taken from the received signal, and means for starting the calculation of the measured values after a set of samples has been stored, and
wherein the measured values are used to search for a carrier wave in the received signal.

16. The system according to claim 15, wherein in addition to sampling and storage, one or more other applications are arranged to be executed between the calculations of the measured values.

17. A method for performing measurements in a wireless terminal comprising:

receiving radio frequency signals transmitted by a base station of a mobile communication network, in which frequency correction bursts are transmitted on a frequency control channel,
taking samples (i,q) from the received signals, and
performing measurements on the basis of said samples, in which method the samples taken from the received signal are stored and measured values are calculated for the stored samples after a set of samples has been stored, storing of samples and calculation of the measured value is repeated at intervals, wherein two or more samples are taken and stored between each successive calculation of the measured value, the calculated measured values are used for searching a carrier wave from the received signal, and the carrier wave to be searched for is a sine wave signal used in the transmission of the frequency correction burst.

18. A wireless terminal comprising:
a receiver for receiving radio frequency signals transmitted by a base station of a mobile communication network, in which frequency correction bursts are transmitted on a frequency control channel,
means for taking samples from the received signals, and
means for performing measurements on the basis of said samples, the wireless terminal further comprising:
means for storing samples taken from the received signal
means for starting the calculation of the measured values after a set of samples has been stored, and
means for searching for a carrier wave on the basis of the measured values calculated from the received signal,
and the carrier wave to be searched for is a sine wave signal used in the transmission of the frequency correction burst.

* * * * *

UNITED STATES PATENT AND TRADEMARK OFFICE
CERTIFICATE OF CORRECTION

PATENT NO.       : 7,039,364 B2
APPLICATION NO.  : 10/242915
DATED            : May 2, 2006
INVENTOR(S)      : M. Majaniemi Page 1 of 1

It is certified that error appears in the above-identified patent and that said Letters Patent is hereby corrected as shown below:

At col. 8, line 17 (claim 1, line 7), please insert --,-- after "stored" in its first instance;

at line 45 (claim 8, line 1), please delete "eempfising"; and at line 51 (claim 8, line 7), please delete --signal-- in its first instance.

At col. 10, line 8 (claim 17, line 10), please insert --,-- after "stored".

Signed and Sealed this

Twenty-ninth Day of August, 2006

JON W. DUDAS
*Director of the United States Patent and Trademark Office*